(12) United States Patent
Madireddi et al.

(10) Patent No.: US 9,303,860 B1
(45) Date of Patent: Apr. 5, 2016

(54) MOISTURE RESISTANT LIGHT TUBE ASSEMBLY AND METHOD OF MANUFACTURE

(71) Applicants: Sesha C. Madireddi, St. Charles, MO (US); Bradley J. Bruggink, Plymouth, WI (US)

(72) Inventors: Sesha C. Madireddi, St. Charles, MO (US); Bradley J. Bruggink, Plymouth, WI (US)

(73) Assignee: WISCONSIN PLASTIC PRODUCTS, INC.

( * ) Notice: Subject to any disclaimer, the term of this patent is extended or adjusted under 35 U.S.C. 154(b) by 170 days.

(21) Appl. No.: 14/039,556

(22) Filed: Sep. 27, 2013

Related U.S. Application Data

(60) Provisional application No. 61/707,918, filed on Sep. 29, 2012.

(51) Int. Cl.
*F21V 29/00* (2015.01)
*F21V 31/00* (2006.01)
*B29C 47/06* (2006.01)
*F21K 99/00* (2010.01)

(52) U.S. Cl.
CPC .............. *F21V 31/005* (2013.01); *B29C 47/06* (2013.01); *F21V 29/22* (2013.01); *F21K 9/10* (2013.01); *F21K 9/17* (2013.01); *F21K 9/175* (2013.01); *F21V 29/004* (2013.01)

(58) Field of Classification Search
CPC ... F21V 29/004; F21V 23/003; F21V 23/005; F21V 15/011; F21V 31/005; F21V 23/004; F21Y 2103/003; F21K 9/10; F21K 9/175; F21K 9/30; F21K 9/50; F21K 9/17; F21L 7/00; F21L 15/06
USPC ......................................... 362/218
See application file for complete search history.

(56) References Cited

U.S. PATENT DOCUMENTS

| | | | |
|---|---|---|---|
| 7,441,922 B2 | 10/2008 | Huang et al. | |
| 2009/0219713 A1 | 9/2009 | Siemiet et al. | |
| 2010/0033964 A1 | 2/2010 | Choi et al. | |
| 2010/0220469 A1* | 9/2010 | Ivey et al. | 362/218 |
| 2011/0299276 A1 | 12/2011 | Lee | |
| 2011/0317410 A1 | 12/2011 | Huang et al. | |
| 2012/0008314 A1 | 1/2012 | Simon et al. | |
| 2012/0176768 A1 | 7/2012 | Wu et al. | |
| 2013/0170197 A1 | 7/2013 | Bishop | |
| 2013/0182442 A1 | 7/2013 | Potucek et al. | |
| 2014/0029249 A1* | 1/2014 | Matsukawa | 362/218 |
| 2014/0185279 A1* | 7/2014 | Shin et al. | 362/218 |

* cited by examiner

*Primary Examiner* — Y M Lee
(74) *Attorney, Agent, or Firm* — Grace J. Fishel

(57) ABSTRACT

A moisture resistant light tube assembly for use in forming a moisture resistant LED light tube. The light tube assembly includes a rear component with an elongated heat sink having a flat strip upon which an LED circuit board (or boards) may be placed under pressure legs formed of a polymer for maintaining the circuit board in thermal contact with the heat sink. A polymer lens provides a dome over the rear component. The light tube assembly is formed by co-extrusion of a polymer shell around the heat sink, co-extrusion of the polymer pressure legs to the polymer shell and co-extrusion of the dome to the rear component from one or more polymers selected for their ability to be bonded together by co-extrusion.

16 Claims, 7 Drawing Sheets

MOISTURE RESISTANT LIGHT TUBE ASSEMBLY AND METHOD OF MANUFACTURE

BACKGROUND OF THE INVENTION

1. Field of the Invention

The present invention relates to a co-extruded LED light tube assembly which is moisture resistant.

2. Brief Description of the Prior Art

LED light tubes or LED luminaries are known and commonly used. These devices are conventionally made from a combination of metal, plastic and glass. A rear component includes a metal heat sink to draw heat away from a LED circuit board mounted therein and a lens is snapped onto or glued onto the rear component with end caps completing the assembly. Commonly available prior art LED light tubes are not watertight or moisture resistant. This is a problem if the LED light tubes are used underwater or in a moist environment such as a refrigerator display case. The LEDs on the LED circuit board require circuitry and electrical connections in order to function properly and moisture can have a detrimental effect on the electronics.

BRIEF SUMMARY OF THE INVENTION

In view of the above, it is an object of the present invention to provide a light tube assembly which may be used to make a moisture resistant LED light tube. Other objects and features of the invention will be in part apparent and in part pointed out hereinafter.

In accordance with the invention, a moisture resistant light tube assembly is formed by co-extrusion of a polymer shell, pressure legs and dome about a heat sink which may roll formed from a thermally conductive metal sheet or cast. A moisture resistant LED light tube may be formed by inserting a LED circuit board (or boards having at least one LED light) under the pressure legs in thermal contact with the heat sink and sealing the ends of the moisture resistant light tube assembly with end caps, said caps having appropriate electric connections for installation of the LED light tube into an electric light fixture.

The invention summarized above comprises the constructions and methods hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

In the following description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not limit the scope of the disclosure. In the development of any implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill using the subject disclosure as a guide.

Figure 1:
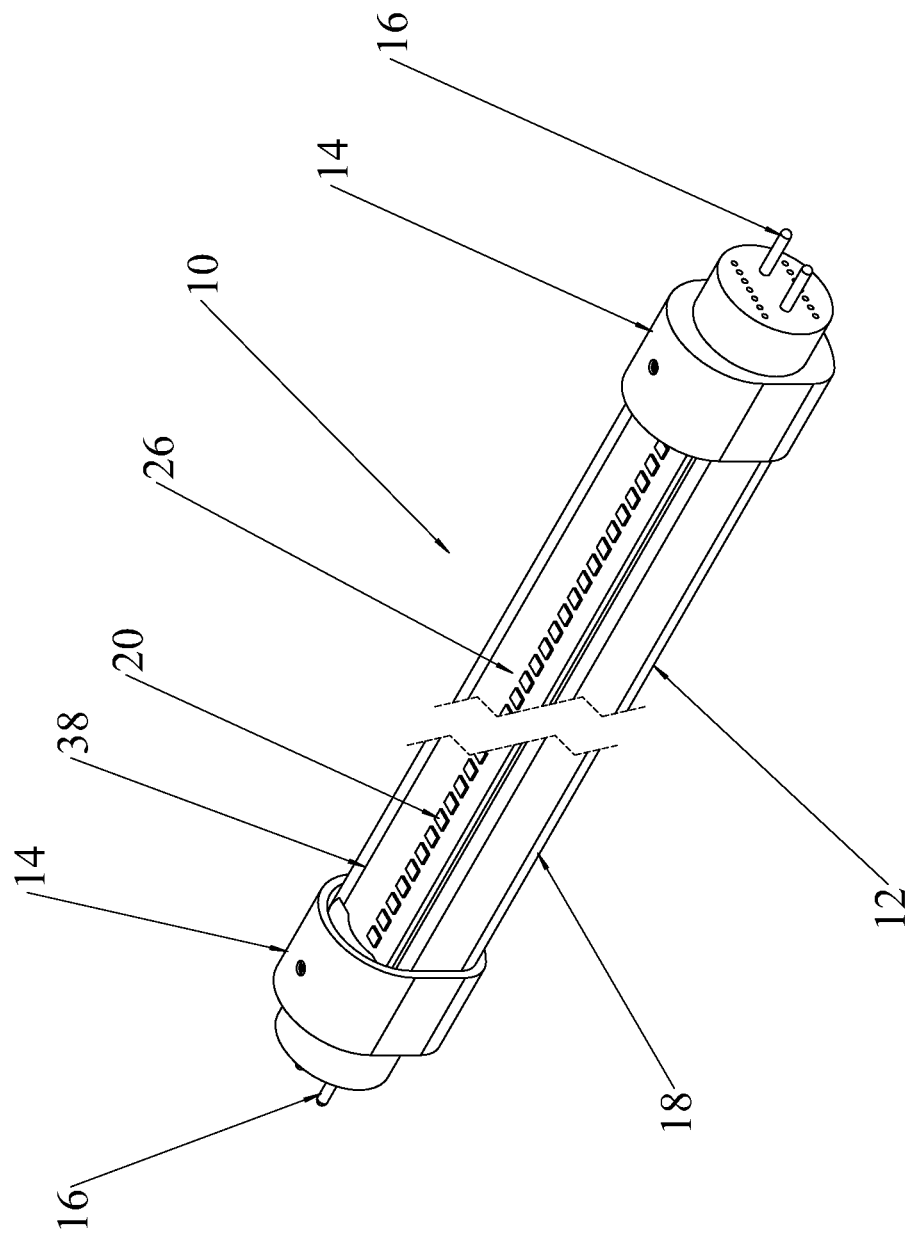
FIG. 1 is a perspective view of a moisture resistant LED light tube illustrating an embodiment of the present invention.

For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the drawings more particularly by reference character and beginning with FIG. 1, reference numeral 10 refers to a LED light tube formed from a light tube assembly 12 in accordance with an embodiment of the invention. End caps 14 are provided on the two distal ends of light tube assembly 12 and are sealed thereto by means of an adhesive, frictional fit or other means as will occur to those skilled in the art. Each end cap 14 includes any manner of external electrical connection such as pins 16. Pins 16 engage into a power supply socket (not shown) in a conventional light fixture.

Figure 2:
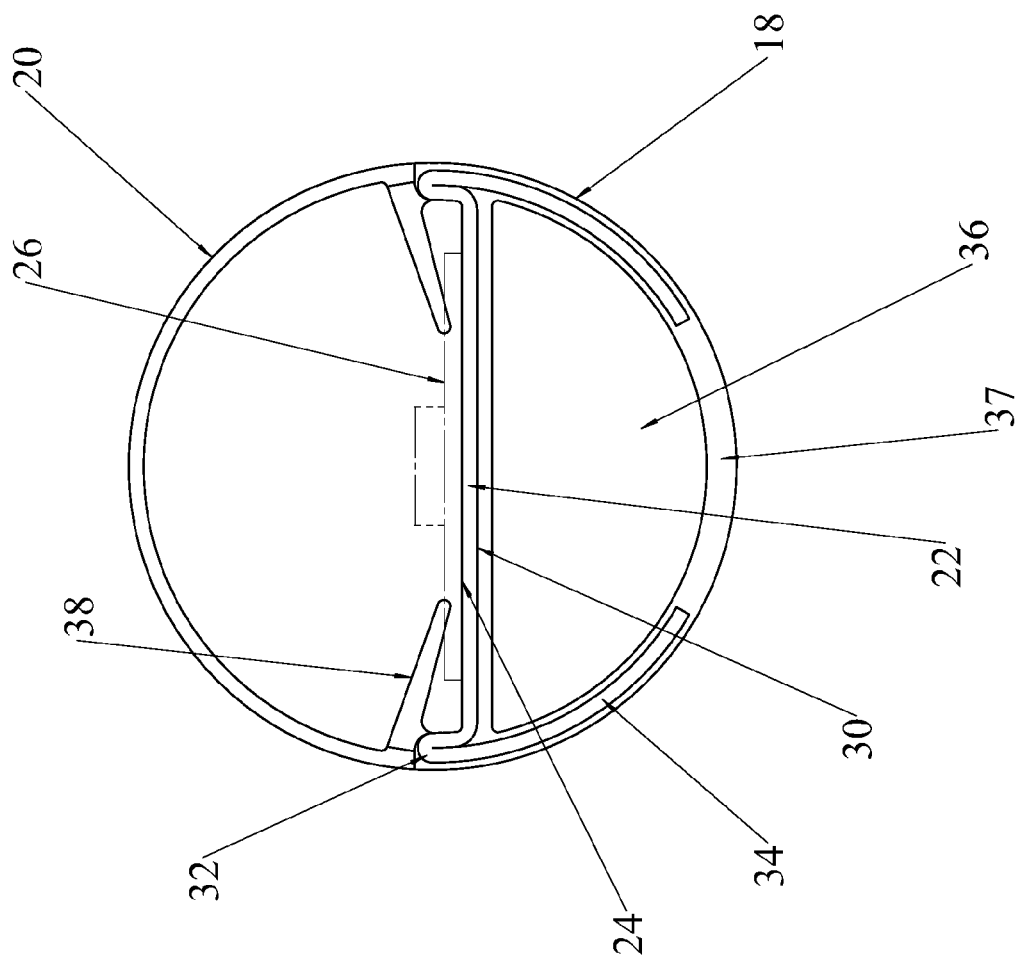
FIG. 2 is a cross-section of a first light tube assembly for use in forming a moisture resistant LED light tube as shown in FIG. 1.
Figure 3:
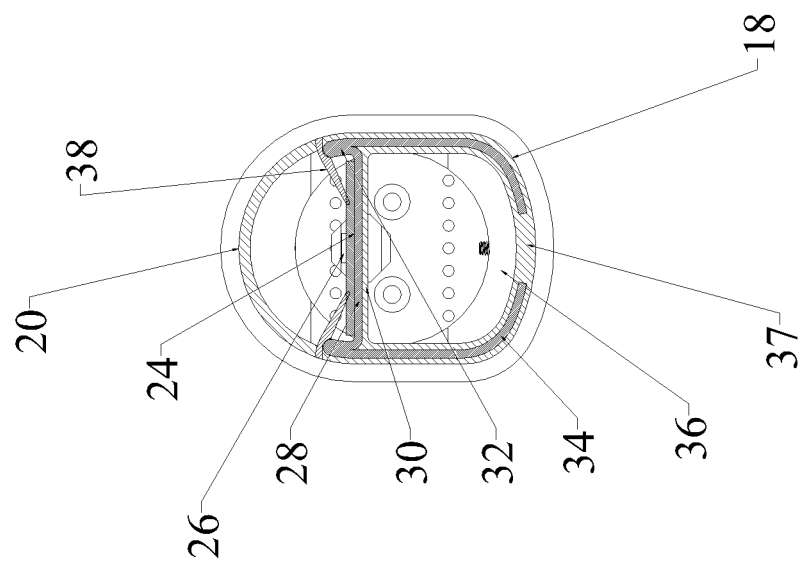
FIG. 3 is a cross-section of a second light tube assembly.
Figure 4:
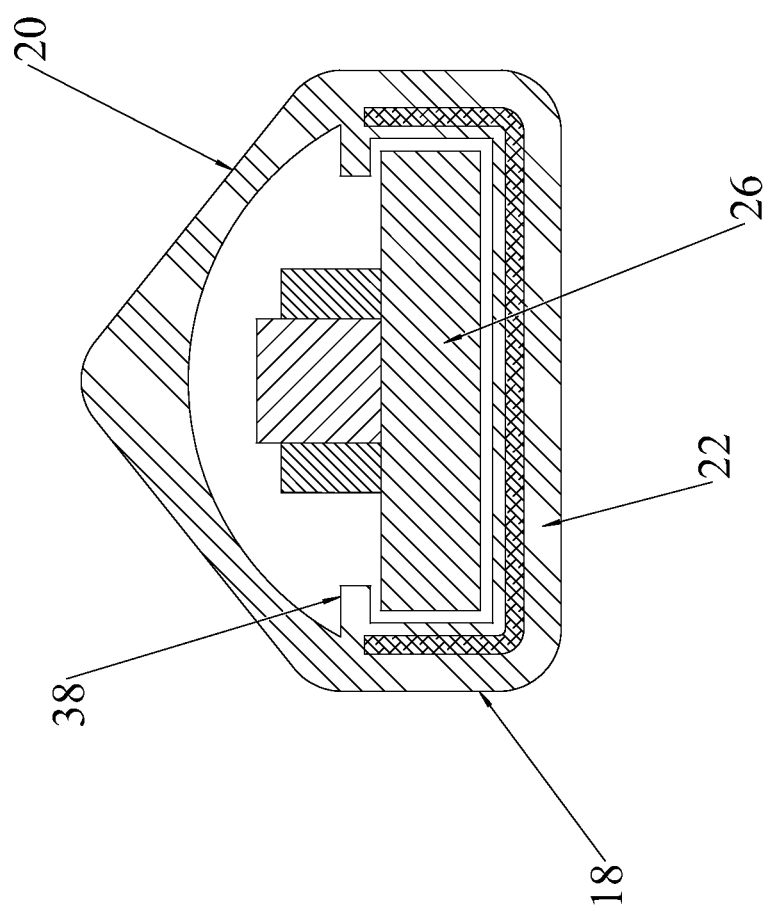
FIG. 4 is a cross-section of a third light tube assembly.

As shown in FIG. 2, light tube assembly 12 includes a sealed polymer housing including an elongated rear component 18 and an elongated front lens 20 fused together to form a watertight or moisture resistance seal. Lens 20 and a plastic shell around rear component 18 are co-extruded from a suitable electrically insulative polymeric material by a process described hereinafter and while light tube assembly 12 is shown as cylindrical can alternatively have a square, triangular, polygonal or other cross-sectional shape, illustrative ones of which are shown in FIGS. 3 and 4. Suitable materials for lens 20 and the plastic shell around rear component 18 are selected for their dimensional stability and ability to be bonded together by co-extrusion to form light tube assembly 10. Suitable materials include polycarbonate, acrylic or other plastic materials recognized as suitable by one of skill in the art. For some applications, a thermally conductive polymer may be preferred for rear component 18.

The term "lens," as used herein, refers not only to an optical component which can focus light, but also components which are merely transparent and do not focus light such as a transparent or translucent cover. Lens 20 can also include light diffusing structures, such as ridges, dots, bumps, dimples and other uneven surfaces.

Rear component 18 includes a heat sink 22 with a flat strip 24 upon which an LED circuit board 26 may be seated. The purpose of heat sink 22 is to draw heat away from the electrical components in LED circuit board 26 to prevent damage. Heat sink 22 is formed of metal having a high thermal conductivity, such as aluminum, copper or stainless steel. With continuing reference to FIG. 2, flat strip 24 has an upper side 28 and a lower side 30 and is flanked by shoulders 32 with downwardly and inwardly directed arms 34 forming a split ring embracing a hollow cavity 36 under lower side 30 of flat strip 24 when heat sink 22 is enveloped in a polymer shell 37 completing rear component 18. Other heat dissipating structures, e.g., fins, extending from flat strip 24 or other geometries may be used as recognized by those of skill in the art for providing increased thermal conductivity.

A pair of opposing, inwardly and downwardly, directed polymer pressure legs 38 are fused to or integrally formed with polymer shell on shoulders 32 for holding LED circuit board 26 on upper side 28 of flat strip 24 under constant pressure. For better heat transfer between LED circuit board 26 and heat sink 22, upper side 28 of flat strip 24 may not be coated with polymer.

In use, LED circuit board 26 or a plurality of LED circuit boards 26 linked end-to-end may be slid along flat strip 24 under pressure legs 38 the length of light tube assembly 12. End caps 14 are then attached finishing assembly of watertight and moisture resistant LED light tube 10. In another embodiment, the space within LED light tube 10 may be filled with a nonreactive gas such as argon or neon for further blocking moisture, oxygen and other gases that might harm the electronics of LED circuit board 26.

If one or more of the LEDs fail on LED circuit board 26, a user can detach LED tight tube 10 from the electric fixture, remove one of end caps 14 and remove LED circuit board 26 from assembly 12. After replacement of the failed LEDS on LED circuit board 26 or replacement of the LED circuit board entirely, LED circuit board 26 may be put back into assembly 12, end cap 14 fastened to the tube and LED light tube 10 reinstalled in the light holder again.

Figure 5:
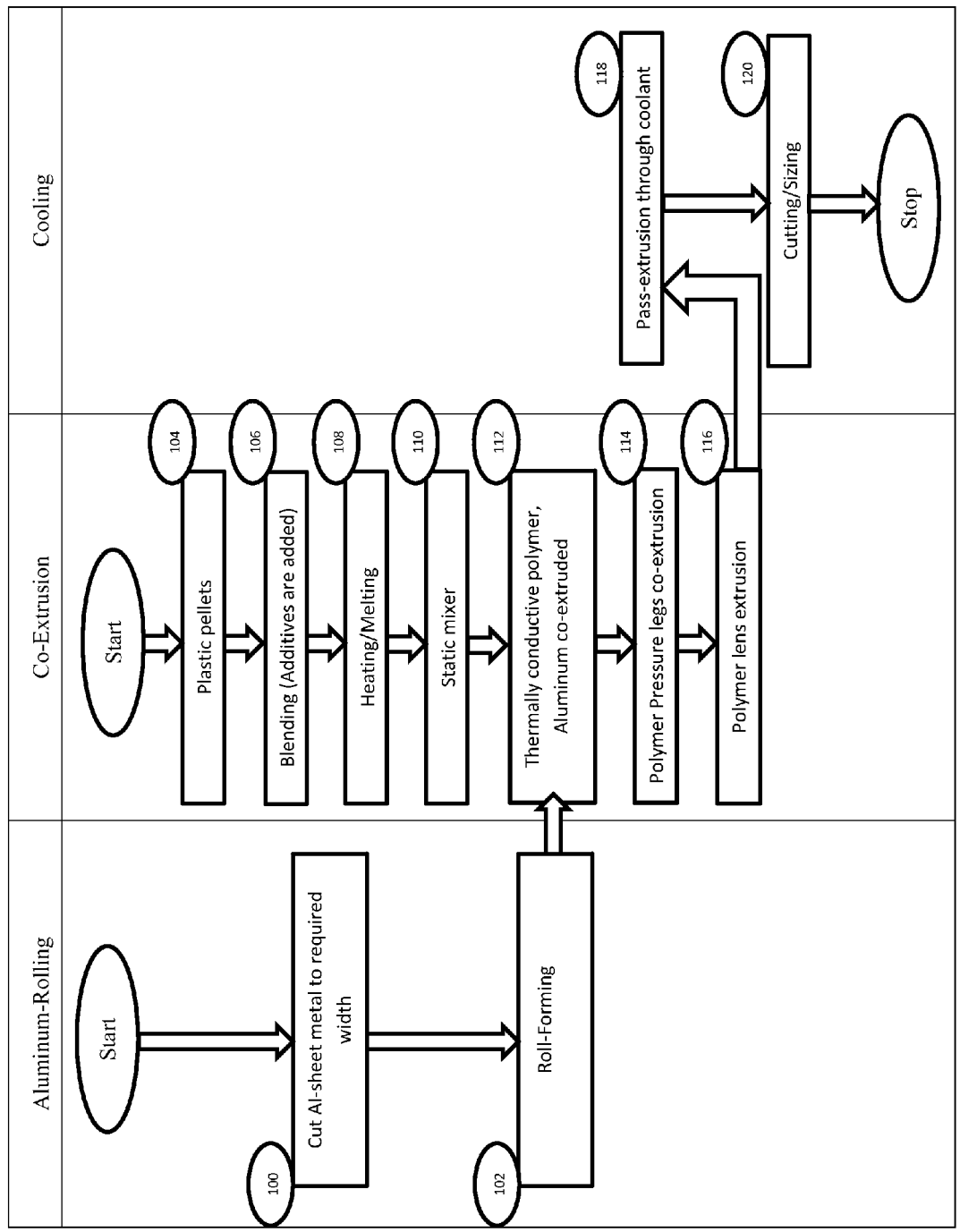
FIG. 5 is a block diagram showing a process for forming a light tube assembly.
Figure 6:
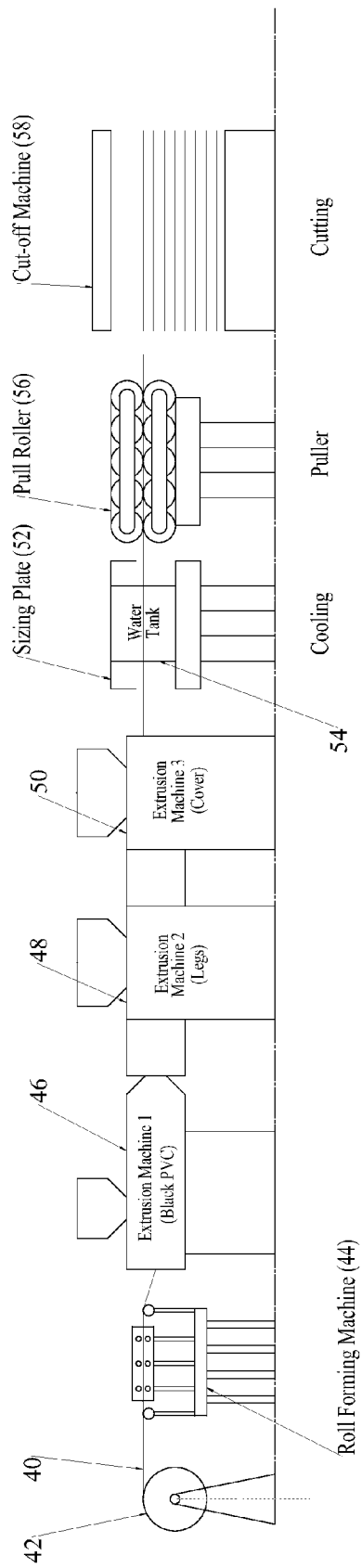
FIG. 6 is a schematic side elevation of a manufacturing system for forming a light tube assembly in accordance with the process shown in FIG. 5; and, FIG. 7 is a schematic top plan view of the manufacturing system illustrated in FIG. 6.
Figure 7:
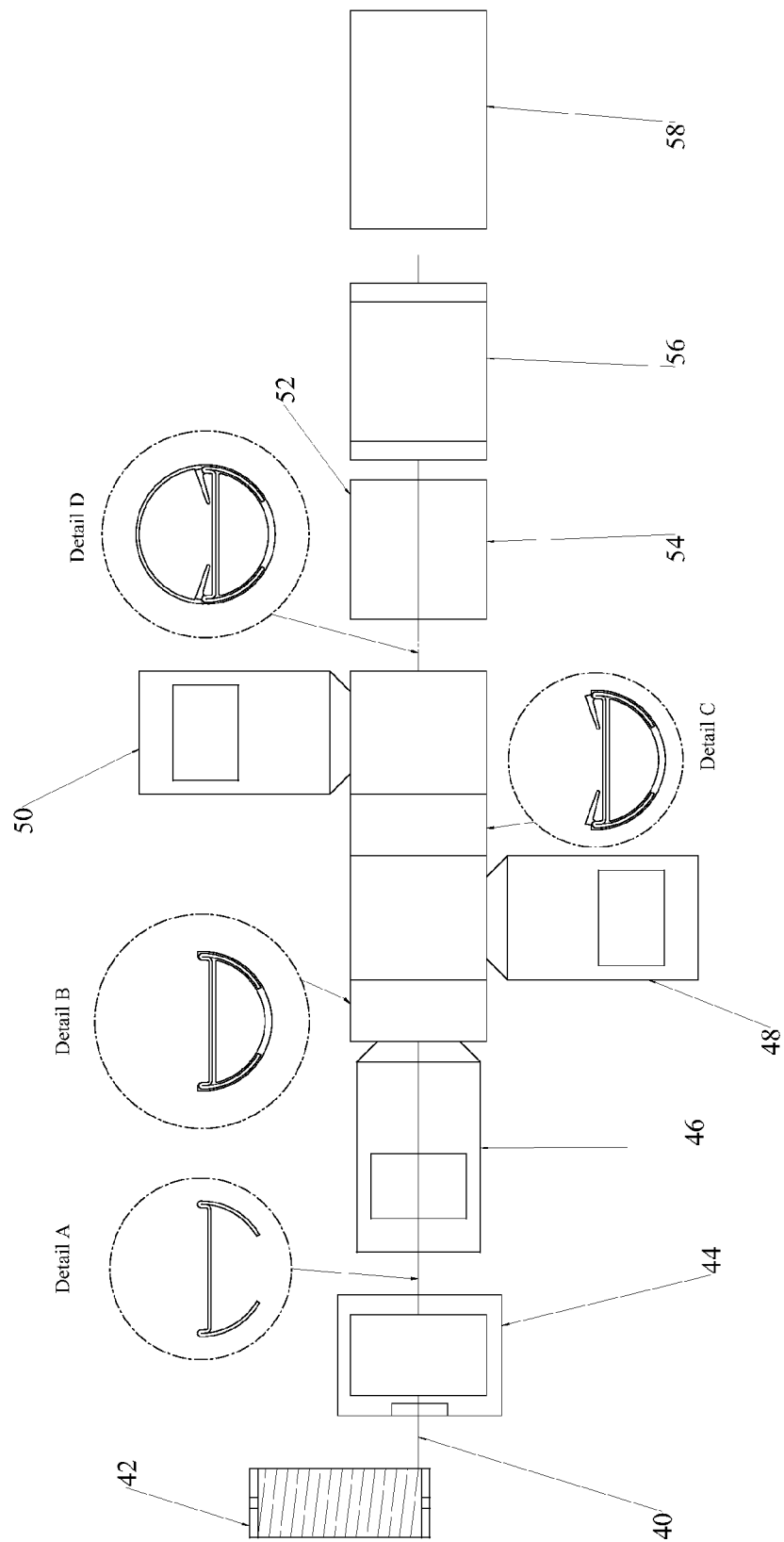

Light tube assembly 12 is manufactured as described in FIG. 5 and shown in FIGS. 6 and 7. Aluminum or other thermally conductive metal is cut to width as described in step 100 and roll formed in step 102 to form heat sink 22 having a cross-section as shown in Detail A in FIG. 7. Meanwhile, plastic pellets in step 104 are blended with additives, heated to melting and mixed in a static mixer in steps 106, 108 and 110, respectively. In step 112, a thermally conductive polymer is co-extruded with heat sink 22 formed in step 102 to form rear component 18 as shown in Detail B in FIG. 7. Pressure legs 38 are co-extruded on rear component 18 in step 114 to form the intermediate structure shown in Detail C in FIG. 7, followed by co-extrusion of lens 20 in step 116 to form light tube assembly 12 as shown in Detail D in FIG. 7. Light tube assembly 12 is passed through a coolant in step 118 and then cut to length in step 120.

The equipment used to practice the method outlined in FIG. 5 and described above is shown in FIGS. 6 and 7. A sheet 40 of aluminum or other thermally conductive metal from a roll 42 is fed into a roll forming machine 44 where it is formed into heat sink 22 having a cross-section as shown in Detail A. From roll forming machine 44, heat sink 22 passed through a first extrusion machine 46 where a polymer shell is co-extruded onto the heat sink 22 forming rear component 18 as shown in Detail B. Rear component 18 is then passed through second extrusion machine 48 where polymer pressure legs 38 are fused to rear component 18 as shown in Detail C. Co-extrusion of lens 20 in third extrusion machine immediately follows thereby fusing lens 20 to rear component 18 and forming a watertight and moisture resistant seal as shown in Detail D. Light tube assembly 12 is passed through a sizing plate 52 and cooled in a water tank 54. It is then passed through pull rollers 56 and cut to length in a cut-off machine 58. Because heat sink 22 and the polymer shell surround it, pressure legs 38 and lens 20 are extruded, the layers have a constant cross-section, providing a more consistent product.

In view of the above, it will be seen that the object of the invention is achieved and other results attained. As various changes could be made in the above constructions and methods without departing from the scope of the invention, it is intended that all matter contained in the above description or shown in the accompanying drawings shall be interpreted as illustrative and not in a limiting sense.

What is claimed:

1. A moisture resistant light tube assembly comprising an elongated rear component and an elongated front lens,
    said rear component including a heat sink with a flat strip with an upper side, said heat sink substantially enveloped in a polymer shell, a pair of opposing polymer pressure legs fused or integrally molded with the polymer shell for holding a LED circuit board down on a top side of the flat strip;
    said lens formed of a polymer and fused to the polymer shell of the rear component forming a moisture resistant dome over the flat strip of the heat sink; and,
    said heat sink including shoulders flanking the flat strip with depending and inwardly directed arms forming a split ring and a cavity under a lower side of the heat sink.

2. The light tube assembly of claim 1 wherein the cross-sections of the heat sink, polymer shell, pressure legs and lens are substantially constant.

3. The light tube assembly of claim 2 wherein the polymer shell, pressure legs and lens are formed of polycarbonate.

4. The light tube assembly of claim 1 wherein the heat sink is formed of aluminum.

5. A moisture resistant LED light tube comprising
    a light tube assembly comprising a rear component and a front lens, said rear component including a heat sink with a flat strip with an upper side, said heat sink substantially enveloped in a polymer shell, a pair of opposing polymer pressure legs fused or integrally molded with the polymer shell for holding a LED circuit board down on a top side of the flat strip; and, said lens formed of a polymer and fused to the polymer shell of the rear component forming a moisture resistant dome over the flat strip of the heat sink;
    end caps sealed on opposite ends of the light tube assembly;
    a LED circuit board or a plurality of LED circuit boards linked end-to-end having one or more LEDs installed, said circuit board or plurality of circuit boards installed on the top side of the flat strip under the opposing pressure legs; and,
    said heat sink in the light tube assembly including shoulders flanking the flat strip with depending and inwardly directed arms forming a split ring and a cavity under a lower side of the heat sink
    whereby the circuit board or circuit boards are held under constant pressure by the pressure legs against the flat strip for more effective heat transfer between the circuit board or circuit boards and the heat sink.

6. The LED light tube of claim 5 wherein the cross-sections of the heat sink, polymer shell, pressure legs and lens are substantially constant in the light tube assembly.

7. The LED light tube of claim 6 wherein the polymer shell, pressure legs and lens in the light tube assembly are formed of polycarbonate.

8. The LED light tube of claim 5 wherein the heat sink in the light tube assembly is formed of aluminum.

9. A method for forming a moisture resistant light tube assembly comprising the steps of:
   roll forming an elongated heat sink having a flat strip from a thermally conductive metal sheet;
   co-extruding a polymer shell around the heat sink to form a rear component;
   co-extruding a pair of polymer pressure legs onto the polymer shell over the flat metal strip;
   co-extruding a polymer dome over the flat strip on the rear component whereby the lens is fused to the plastic shell around the heat sink,
   said heat sink and co-extruded polymer shell, pressure legs and dome having a substantially constant cross-section along the length of the light tube assembly.

10. The method of claim 9 wherein the polymers for the shell, the pressure legs and the lens are capable of being bonded together by co-extrusion.

11. The method of claim 9 wherein the lens and the pressure legs are formed of polycarbonate or acrylic and the shell is formed from a thermally conductive polymer.

12. The method of claim 9 wherein the lens, pressure legs and shell are formed of polycarbonate.

13. The method of claim 12 wherein the heat sink is roll formed from a sheet of aluminum, copper or stainless steel.

14. The method of claim 13 wherein the thermally conductive sheet is roll formed into a heat sink having shoulders flanking the flat strip with depending and inwardly directed arms forming a split ring.

15. The method of claim 14 wherein a cavity is formed under a lower side of the heat sink when the polymer shell is co-extruded around the heat sink.

16. The method of claim 9 wherein the heat sink has an upper side and a lower side and the polymer is co-extruded with the heat sink such that the polymer shell does not cover the upper side of the flat strip.

\* \* \* \* \*